US007558257B2

(12) United States Patent
Deng (10) Patent No.: US 7,558,257 B2
(45) Date of Patent: Jul. 7, 2009

(54) INFORMATION SWITCH (75) Inventor: Yihui Deng, Shenzhen (CN)

(73) Assignee: Liming Network Systems Co., Ltd., Shenzhen (CN)

(*) Notice: Subject to any disclaimer, the term of this patent is extended or adjusted under 35 U.S.C. 154(b) by 1365 days.

(21) Appl. No.: 10/241,503

(22) Filed: Sep. 10, 2002

(65) Prior Publication Data
US 2003/0081618 A1 May 1, 2003

Related U.S. Application Data (63) Continuation of application No. PCT/CN00/00047, filed on Mar. 10, 2000.

(51) Int. Cl.
H04L 12/66 (2006.01)
(52) U.S. Cl. .................. 370/364; 370/387; 370/362; 370/402; 370/398
(58) Field of Classification Search ......... 370/362–368, 370/398, 401, 422, 423, 424, 438, 439, 265, 370/503, 426, 236, 402; 709/249, 244, 225, 709/227, 203, 230; 715/501.1, 513
See application file for complete search history.

(56) References Cited

U.S. PATENT DOCUMENTS

| 4,442,502 | A | * | 4/1984 | Friend et al. ............... 710/316 |
| 5,544,163 | A | | 8/1996 | Madonna |
| 5,555,244 | A | * | 9/1996 | Gupta et al. ............... 370/397 |
| 5,774,551 | A | * | 6/1998 | Wu et al. ................... 713/155 |
| 6,333,928 | B1 | * | 12/2001 | Schaal et al. ............... 370/360 |
| 6,363,077 | B1 | * | 3/2002 | Wong et al. ................ 370/422 |
| 6,434,141 | B1 | * | 8/2002 | Oz et al. .................... 370/352 |
| 6,498,787 | B1 | * | 12/2002 | Yi et al. ..................... 370/328 |
| 6,732,175 | B1 | * | 5/2004 | Abjanic .................... 709/227 |
| 7,054,901 | B2 | * | 5/2006 | Shafer ....................... 709/203 |
| 2002/0004390 | A1 | * | 1/2002 | Cutaia et al. ............... 455/424 |
| 2002/0009188 | A1 | * | 1/2002 | Rosset et al. ............ 379/221.15 |
| 2002/0035605 | A1 | * | 3/2002 | McDowell et al. .......... 709/206 |
| 2003/0193967 | A1 | * | 10/2003 | Fenton et al. ............... 370/490 |
| 2004/0109438 | A1 | * | 6/2004 | Chen ........................ 370/352 |

FOREIGN PATENT DOCUMENTS

| WO | WO 97/34425 | 9/1997 |
| WO | WO 01/03011 A2 * | 1/2001 |

OTHER PUBLICATIONS

International Search Report corresponding to International Application No. PCT/CN00/00047 dated Oct. 26, 2000.

* cited by examiner

Primary Examiner—Ricky Ngo
Assistant Examiner—Dewanda Samuel
(74) Attorney, Agent, or Firm—Alston & Bird LLP (57) ABSTRACT The invention discloses an information switch, which comprises a management system, a core switching system and an information routing system. The core switching system at least comprises an information bus, a switching module and a switching management module. The information bus comprises an access bus (D-Bus) for connecting with device access gateways, a service bus (S-Bus) for connecting with service gateways, a management bus (M-bus) for connecting with the management system, and a routing bus (R-Bus) for connecting with the information routing system. The management system and the information routing system are connected with core switching via the information bus to perform, respectively, system management and routing management.

10 Claims, 7 Drawing Sheets

INFORMATION SWITCH

CROSS-REFERENCE TO RELATED APPLICATIONS

This is a continuation application of PCT/CN00/00047, filed Mar. 10, 2000, which is incorporated herein by reference in its entirety.

FIELD OF THE INVENTION

The present invention relates generally to the information processing technology field, and more particularly to an information switch for information switching processing.

BACKGROUND OF THE INVENTION

The appearance of Electronic Business (e-Business) is a significant development in the information society and in information processing technology. All e-Business activities can be summed up as trade information that is switched between a user and a service provider (such as store) i.e. trade information switching between a user terminal and a service terminal. For example, a user accessing a store Web site for purchasing commodities through Internet sends purchase information to a service provider, and the service provider sends back acknowledgement information. In practice, there are large varieties of communication equipment, communication media and communication protocols that can be used for information switching between a user and a service provider. Taking communication media as an example, there are Internet, telephone, facsimile, handset, cable TV and terminal equipment based on WAP (Wireless Application Protocol), etc., and there will be more in the future.

Figure 1:
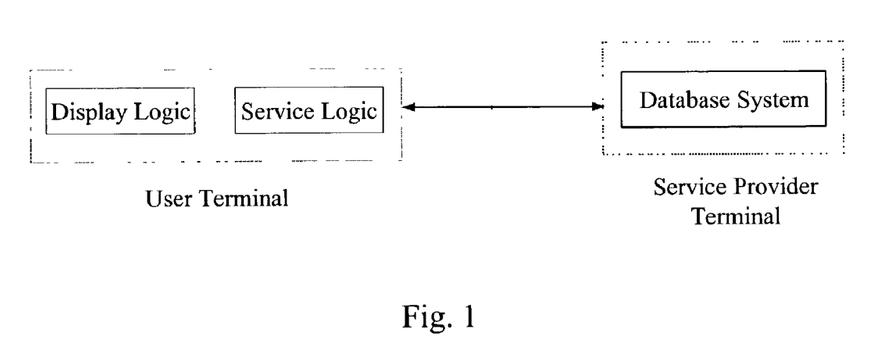
FIG. 1 is a diagram of an embodiment of a client/server mode for information switching.

For information switching processing, the earliest scheme is the mainframe/terminal mode; i.e. a user operates a mainframe directly through a terminal. This mode is simple in architecture and fast in response speed, but cannot work collaboratively. Along with the development of PCs and LANs, a Client/Server mode appeared. FIG. 1 shows that a client terminal includes service logic and display logic and service terminals are implemented by a shared database, in general. This scheme begins to consider the separation of a user terminals with a database, but their connection is still close.

Figure 2:
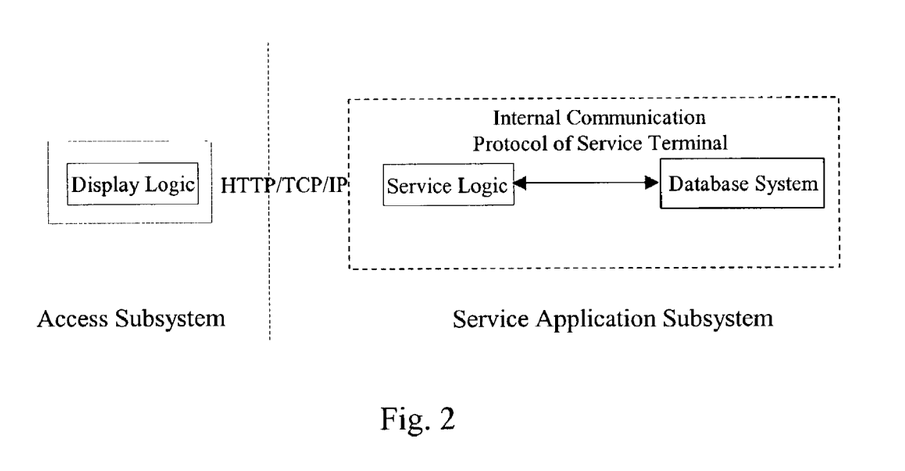
FIG. 2 is a diagram of an embodiment of a three-tier mode for information switching.
Figure 3:
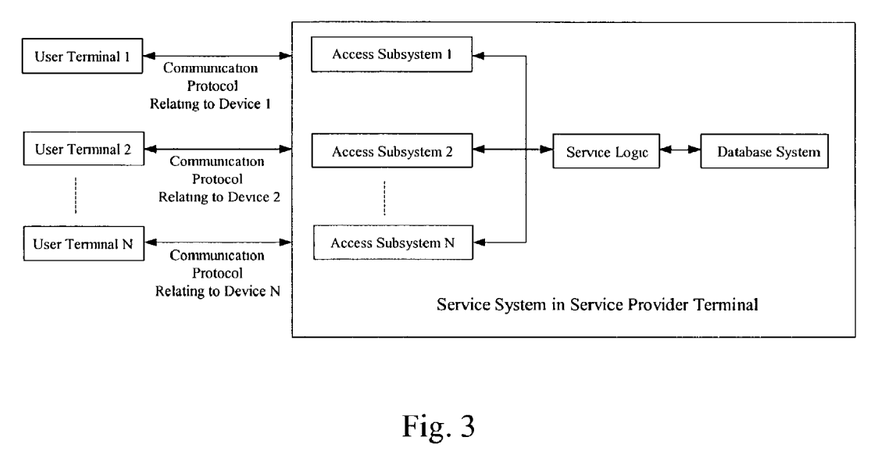
FIG. 3 is an exemplary access diagram of different user terminals for a system employing the embodiment shown in FIG. 2.

In order to reduce the complexity of a user terminal, at present, a more general mode is a three-tiered architecture with the Internet in the middle, as shown in FIG. 2. The main feature of this mode is separation of display logic and service logic. Many computer companies deploy this mode, such as IBM e-Business, Microsoft Window digital nerves system, etc. The relationship between the access subsystem and the service application subsystem is a client/server relationship, and the communication protocol between them is the internal unique protocol of the service terminal. In order to adapt the system for different user terminal equipment and protocols, different access subsystems are used, as shown in FIG. 3.

The information switching mode, mentioned above, is limited to a specific application. Different applications, i.e. an application subsystem, must have different communication access subsystems related to different services provided. In order to support a variety of information switching activities, every service provider (service terminal) must have an independent and complete application system, including access systems and application systems. This is because whether a service provider or a user terminal, the terminal must independently deal with communication media, communication protocol etc., which relate to information switching, must set up processing systems to process such as information switching media, protocol and other issues.

Figure 4:
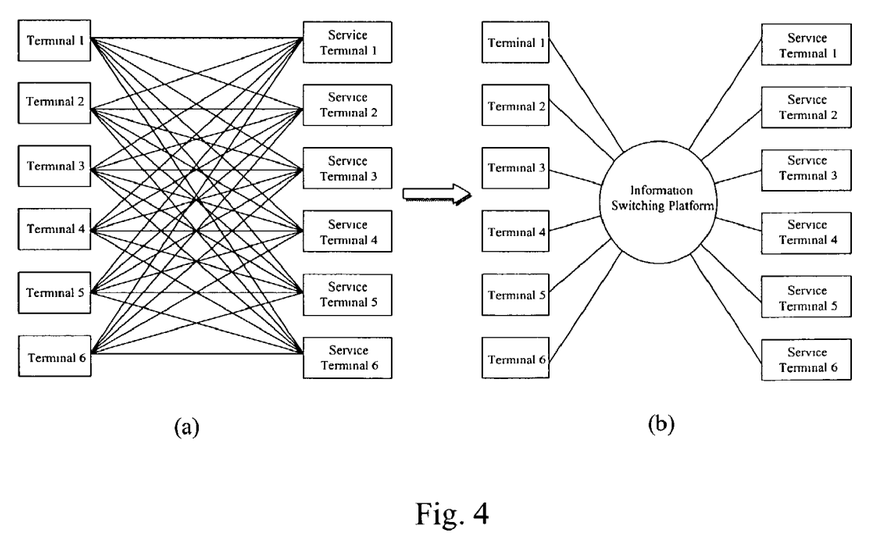
FIG. 4 is a comparison diagram for comparing the information switching mode of FIG. 2 (as shown in FIG. 4(a)) and the information switching mode of an embodiment of the invention (as shown in FIG. 4(b)).

At present, in information switching application areas such as e-Business, there are a variety of access manners, such as Internet, telephone, facsimile, handset, cable TV, etc. Therefore, a service provider needs to provide different access manners for different users. Consequently, the net connection between user terminals and service terminals is very complicated as shown in FIG. 4(a). This is an obstacle for spreading information switching applications, such as e-Business.

In order to solve the problem mentioned above, an information switching platform for switching information between user terminals and service providers is proposed. In the platform, the service request or acknowledgement information sent by different terminals through different communication lines and different protocols are converted to a unique information format, such as SML (service mark language). The request or acknowledgement information sent by service providers is also converted to the unique information format (SML). In this way, the service request and acknowledgement information between user terminals and service terminals are matched via an information switching mechanism. Therefore, without complicated connections and protocols between user terminals and service terminals, a user terminal accesses different service terminals with a single line, and a service terminal provides services to different user terminals with a single line too.

Figure 5:
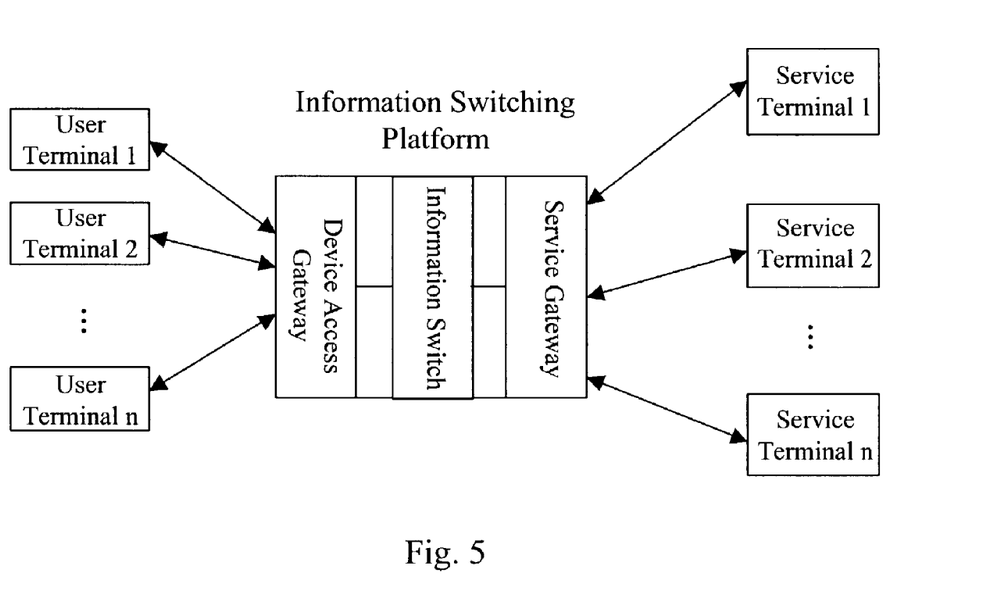
FIG. 5 is an exemplary diagram for an embodiment of an information switching platform.

For the purpose mentioned above, the information switching platform adds a Device Access Gateway and a Service Gateway on the present information switching mode. They convert service request and acknowledgement information to a unique information format SML. Then, through special information switching mechanism of the platform, information switching is implemented. FIG. 5 shows a typical mode of the platform, wherein information switch (i-switch) exchanges information.

SUMMARY OF THE INVENTION

The invention provides one kind of an information switching mechanism, the information switch, which transforms complicated information switching procedures between user terminals and service terminals into simple platform operations which implement integrated access, application and management of information switching.

The information switch of the invention comprises a Management System and a Core-Switching System. The core-switching system comprises an Information Bus, which is an interface between the information switch and peripherals, a Switching Module and a Switching Manager Module. The management system is connected with the core-switching system via the information bus.

The information bus comprises an information input/output interface and a data communication channel. The information bus can be divided into an access bus (D-BUS) connecting with a device access gateway, a service bus (S-BUS) connecting with a service gateway, and a management bus (M-BUS) connecting with the management system.

The information switch further comprises an Information Routing System for routing management. The information bus further comprises a routing bus (R-BUS) for connecting with the information routing system. The information routing system at least comprises a Remote Communication Module for connecting with remote platform and a Routing Table for storing routing information.

In the technical scheme mentioned above, there can be many switching modules that form a switching cluster. Connections between the switching modules can deploy load-balancing technology by adding a front-end processor or can be implemented by internal high speed channel of the switching module.

The switching management module comprises a Switching Module Manager, which manages the whole core-switching system; a Switching Module Monitor, which monitors and controls the switching system; a Session Manager, which manages session type information switching of information switching; and a Security Manager, which controls security of the core-switching system.

The management system, mentioned above, comprises a Certificate Authentication Service, a Service Manager, a Billing Manager, a User Manager, an Access Manager and a Monitor.

The invention transforms the complicated information switching procedure between user terminals and service terminals to a simple platform operation, as shown in FIG. 4(b). At the same time, the invention implements integrated access, application and management of information switching. Consequently, a user can access different service terminals with any terminal equipment, and service terminals can provide service to different user terminals with a lease line. Every service terminals with an integrated standard application can provide service to different access devices. The existing application can be transformed to a standard application through a simple service gateway.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 6:
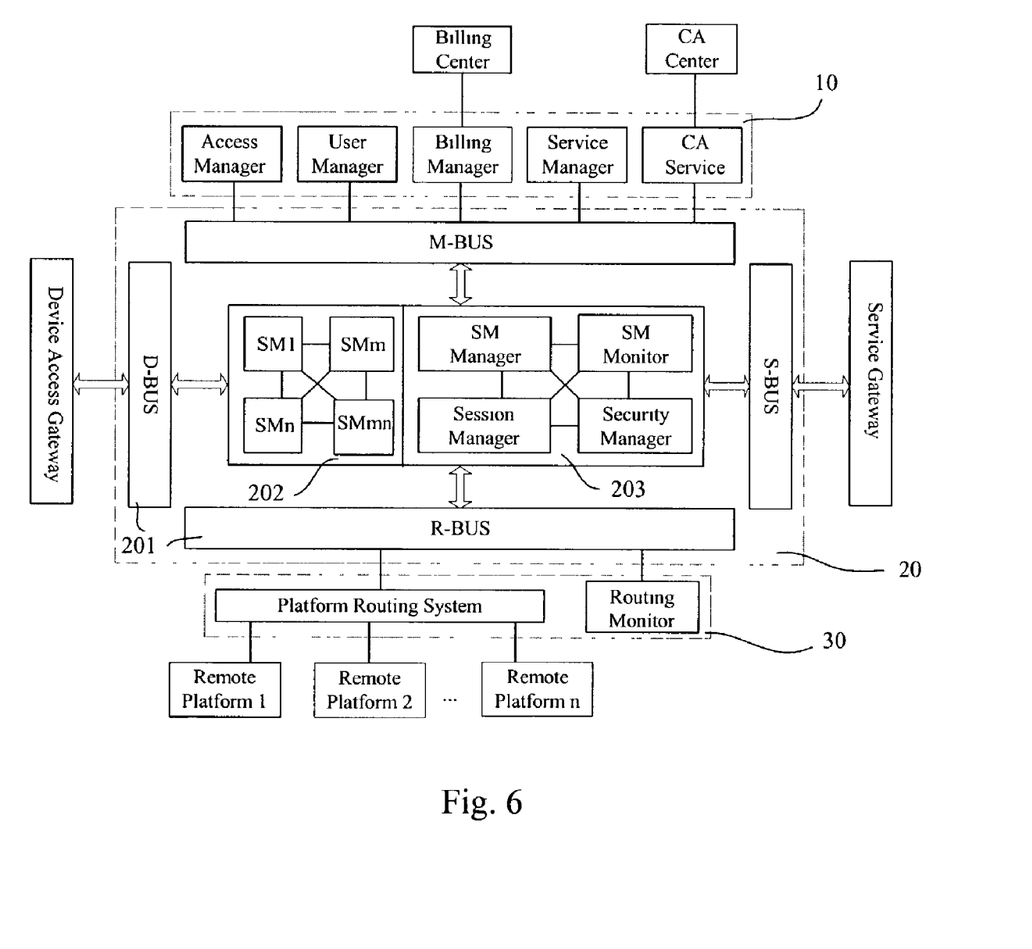
FIG. 6 is a exemplary diagram of an embodiment of an information switch of the invention.

FIG. 6 shows an information switch (i-switch) of the invention, which comprises a platform management system 10, a core-switching system 20 and an information routing system 30, wherein the information routing system 30 is optional, which implements functions such as remote synchronization and roaming between information switches of the invention.

The platform management system 10 is comprised of subsystems: an Access Manager, a User Manager, a Service Manager, a Billing Manager and a Certificate Authentication (CA) service. The billing manager may be connected with a third part Billing Center, and sends the platform billing information to the billing center in a standard data format. The CA can connect with a third party CA center, provide electronic certificates for communicating with other CAs, and deliver user electronic certificates for the platform. The platform management system 10 further comprises a platform monitor, which monitors the access monitor of an access gateway, the service monitor of a service gateway, the SM monitor of a core-switching system and the router monitor of an information routing system.

The core-switching system 20 can be extended according to the switching capacity requirement, and comprises a Bus 201, a Switching Module (SM) 202 and a Switching Management Module 203.

With a standard API interface, the Bus 201 can connect with different device access gateways and provide an information switching path between device access gateways. Therefore, the information switching between device access gateways is transformed to data exchange between buses. The bus receives standard mark language script, including a server number, selects a switch channel, and sends data to a destination device's access gateway. The bus interface provides a dynamic link library, can provide a transmission mode without connect mode, conversation mode having connect mode, and transmission mode of speediness channel mode.

According to the performed function, the Bus 201 can be divided into an access bus (D-Bus), which connects device access gateways of various peripherals to the information switch, a service bus (S-Bus), which accesses various service gateways, a management bus (M-Bus), and a routing bus (R-Bus), which access various management systems and routing systems, respectively.

The information switching of the core-switching system is performed by a switching module 202.

The Switching Management Module 203 comprises a SM Manager, a SM Monitor, a Session Manager and a Security Manager. The SM Manager manages the whole core-switching system. The SM Monitor monitors and controls the core-switching system. The session manager manages session information for information switching. The security manager controls security of the core-switching system.

Figure 7:
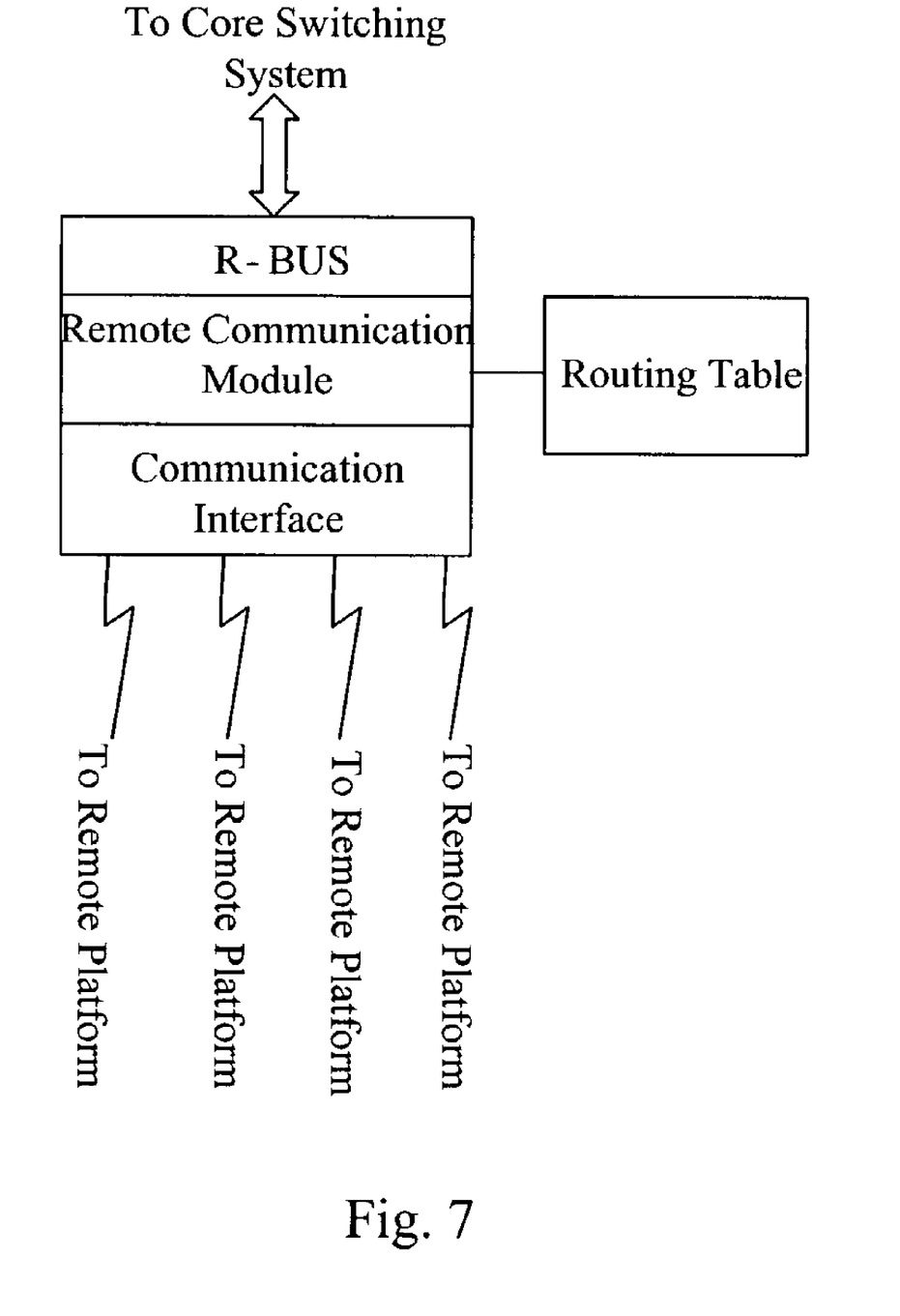
FIG. 7 is an exemplary diagram of an embodiment of an information routing system of the invention.

The information routing system 30 controls functions such as data synchronization and service roaming between remote platforms. Referring to FIG. 7, The R-Bus does not directly belong to the information routing system 30. The remote communication module controls connections with non-local platforms, including transaction integrality control and session control. The routing table stores routing information.

Figure 8:
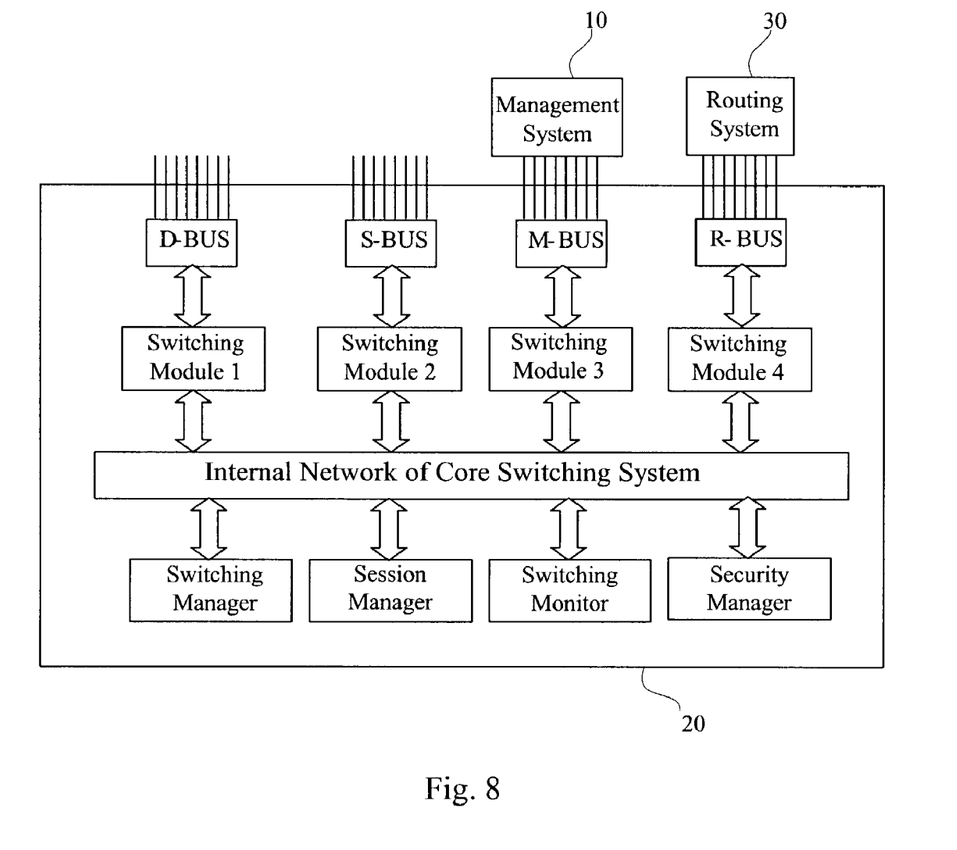
FIG. 8 is an exemplary physical structure diagram of an embodiment of an information switch of the invention.

FIG. 8 is the physical structure diagram of an information switch of the invention. As shown in the diagram, different device access gateways are connected to a core-switching system through the D-Bus, and different service gateways are connected to core-switching system through the S-Bus. An information packet sent by a device access gateway and a service gateway is in a unique i-SML format. The packet head of an i-SML information packet mainly includes the following information fields: an information source address, an information destination address, an information type and an information sequence number. In addition, the information routing system 30 and management system 10 of the information switch exchange i-SML packets with the core-switching system 20 through the R-Bus and the M-Bus, respectively.

When an i-SML information packet has arrived at the information bus, the address information in the packet is transformed to an internal address of the core-switching system, and a switching packet, used for switching of core-switching system, is formed. The switching packet has a source address and a destination address and is sent to the switching module. According to the destination address, the switching module sends the switching packet to the destination switching module.

After the destination switching module has received a switching packet, the switching packet is sent to an information bus corresponding to the destination address of the switching packet.

The information bus sends the information to the destination service terminal or the destination device access gateway.

The information source address and destination address of the i-SML information packet are both addresses of a device access gateway or an address of a service terminal. The address is uniquely numbered by the information switch. Therefore, an information switch is directly oriented to service switching. A device access gateway can be seen as a special service terminal.

The main task of the core-switching system is to switch information from one bus to another bus, or return to the source bus. Switching can be implemented with many switching methods, such as concentrated switching, dynamic distributed switching, static distributed switching, a switching matrix, etc. The following, taking concentrated switching as an embodiment, describes the implementation of the core-switching system.

Figure 9:
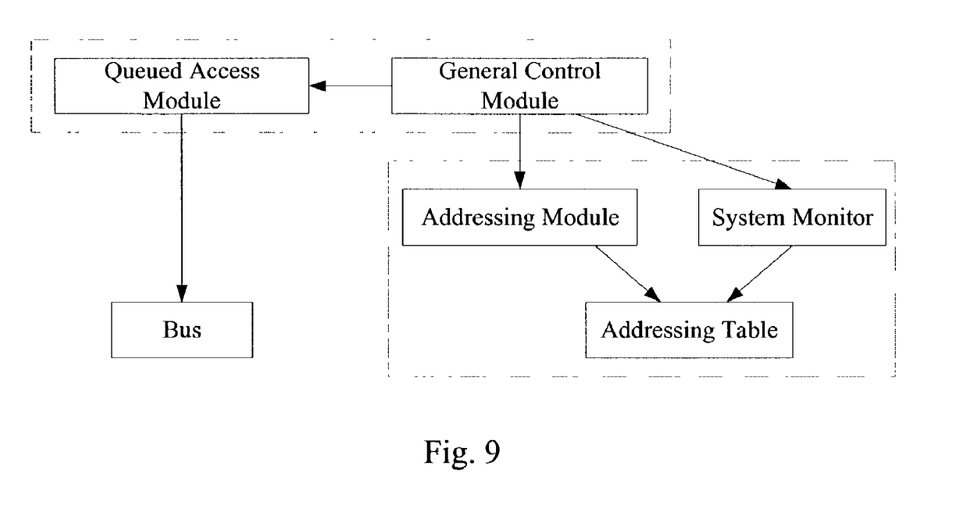
FIG. 9 is an exemplary structure diagram of an embodiment of a switching module and a switching manager module for a concentrated switching of the invention.

Information switching of a core-switching system is performed by a switching module (SM). FIG. 9 shows a structure diagram of an embodiment of a switching module and a switching management manager with the concentrated switching method. As shown in FIG. 9, a switching module includes a general control module and a queued access module. A switching management module includes an addressing module, a system monitoring module and an addressing table.

The general control module controls the whole switching module, which includes getting requests from a queued access module, getting a destination service name, looking for the corresponding physical destination address from the addressing module, and accessing the queued access module again for setting the request. The queued access module accesses data packets in the queue. The addressing module gets an idle destination physical address. The system monitoring module monitors states of every client and writes data to the addressing table.

Figure 10:
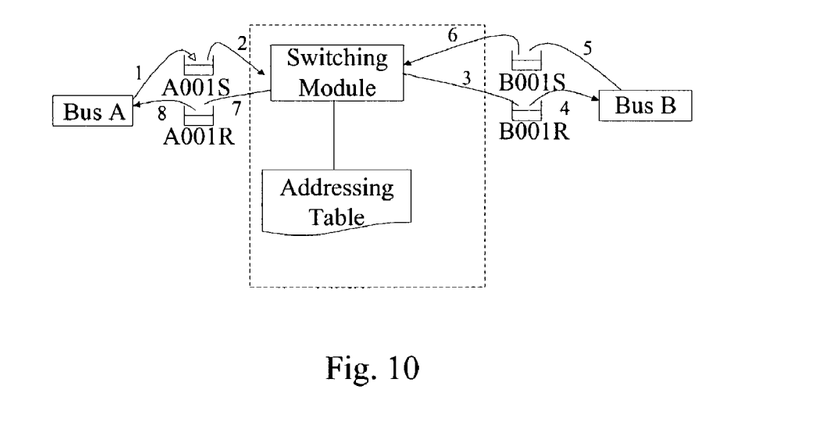
FIG. 10 is an exemplary flowchart of concentrated switching of an embodiment of the invention information switch.

FIG. 10 shows a flowchart of information switching, mentioned above, and comprising the following steps:

0) Bus A and Bus B information both log in to the system and get their own receiving queues and sending queues.

1) Bus A information sends a request (B, Data1, A, A001R) to A001S sending queue, wherein B represents destination logic address, Data1 represents the request content, A represents source logic address and A001R represents source physical address.

2) The core-switching module has detected that there is a data request in A001S and receives the data request.

3) The core-switching module gets physical address B001R of B from the addressing table, and sends the request to B001R.

4) The bus B gets the data request from B001R and processes.

5) The bus B sends an acknowledgement data (A, A001R, Data2, B) to B001S.

6) The core-switching module has detected that there is a data request in B001S and receives the data request.

7) The core-switching module has checked that there is a physical address in the bus A and sends directly the data to A001R without addressing.

8) The bus A gets an acknowledgement from A001R.

The essential point of the scheme is that the addressing table can be maintained. For example, for the same bus B there are many instances in the addressing table, i.e. a bus B has many physical addresses and the operation states of every address are recorded. When addressing, the core-switching module can dynamically select a physical address of the idlest instance according to the operation states. In this way, load of the system is dynamically balanced.

It is natural that the switching ability will be linearly extendable. It is obvious that the bottleneck of information switching is the switching module, whose switching performance directly relates to the whole information switch performance.

In order to solve the bottleneck problem, many switching modules can be used to form a switching cluster. The switching ability of an information switch is approximately and linearly increasing with the number of switching modules. There are many methods for switching modules connection, such as distributing load to every switching module with a front-end processor, implementing connection between modules by the internal high-speed channel of switching modules, etc.

The invention claimed is:

1. An information switch for implementing information switching matches comprising:
   a management system; and
   a core switching system;
   wherein the core switching system comprises an information bus which is an interface between the information switch and peripherals, a switching module, and a switching management module, which are used for implementing the switching of a unique format information packet, said unique format information packet comprising an i-SML (information-service mark language) format information packet, wherein the header of the i-SML format information packet comprises a source information address, a destination information address, an information type and an information sequence number;
   wherein the management system is connected with the core switching system via the information bus to perform system management; and
   wherein the information bus is comprised of an information input/output interface and a data communication channel, and the information bus is further comprised of an access bus connecting with an external device access gateway, a service bus connecting with an external service gateway, and a management bus connecting with the management system.

2. The information switch according to claim 1, further comprising an information routing system for routing management.

3. The information switch according to claim 2, wherein the information bus is comprised of an information input/output interface; and a data communication channel.

4. The information switch of claim 3, wherein the information bus is divided into an access bus connecting with external device access gateways; a service bus connecting with external service gateways; a management bus connecting with the management system; and a routing bus connecting with the information routing system.

5. The information switch according to claim 2, wherein the information routing system is comprised of:
   a remote communication module connecting with remote platform; and
   a routing table storing routing information.

6. The information switch according to claim 1, wherein the switching management module is comprised of:
   a switching module manager that manages the whole core switching system;
   a switching module monitor that monitors and controls the core switching system;
   a session manager that manages session type information switching; and
   a security manager that controls security of the core switching system.

7. The information switch according to claim 1, wherein the switching module is comprised of a general control module; and a queued access module.

8. The information switch according to claim 7, wherein the switching management module is further comprised of:
   an addressing module;
   a system monitoring module; and
   an addressing table;
   wherein the general control module gets a request from the queued access module, gets a destination service name by unpacking packet head data, gets corresponding destination physical address from the addressing module, and sets the request to the queued access module; the queued access module accesses data packets in the queue; the addressing module gets an idlest destination physical address according to destination logic or service address; and the system monitor module monitors every client state and stores the state data to the addressing table.

9. The information switch according to claim 1, further comprising a plurality of switching modules, with each switching module having a connection to another switching module to form a switching cluster, and where the connections between the switching modules deploy load balancing technology by adding a front-end processor, or implemented by an internal high speed channel of the switching module.

10. The information switch according to claim 1, wherein the management system comprises a certificate authentication service; a service manager; a billing manager; a user manager; an access manager; and a monitor.

* * * * *

UNITED STATES PATENT AND TRADEMARK OFFICE
CERTIFICATE OF CORRECTION

PATENT NO. : 7,558,257 B2  Page 1 of 1
APPLICATION NO. : 10/241503
DATED : July 7, 2009
INVENTOR(S) : Deng It is certified that error appears in the above-identified patent and that said Letters Patent is hereby corrected as shown below:

Title page,
Item (*) Notice: add additional paragraph,
--This patent is subject to a terminal disclaimer.--;
Item (57) ABSTRACT,
Line 12, after "switching" insert --system--.

Signed and Sealed this

First Day of December, 2009

David J. Kappos
*Director of the United States Patent and Trademark Office*